March 27, 1951 S. HILDER 2,546,893
OPERATION CONTROL AND TERMINATING MECHANISM
Filed Aug. 6, 1947 3 Sheets-Sheet 3
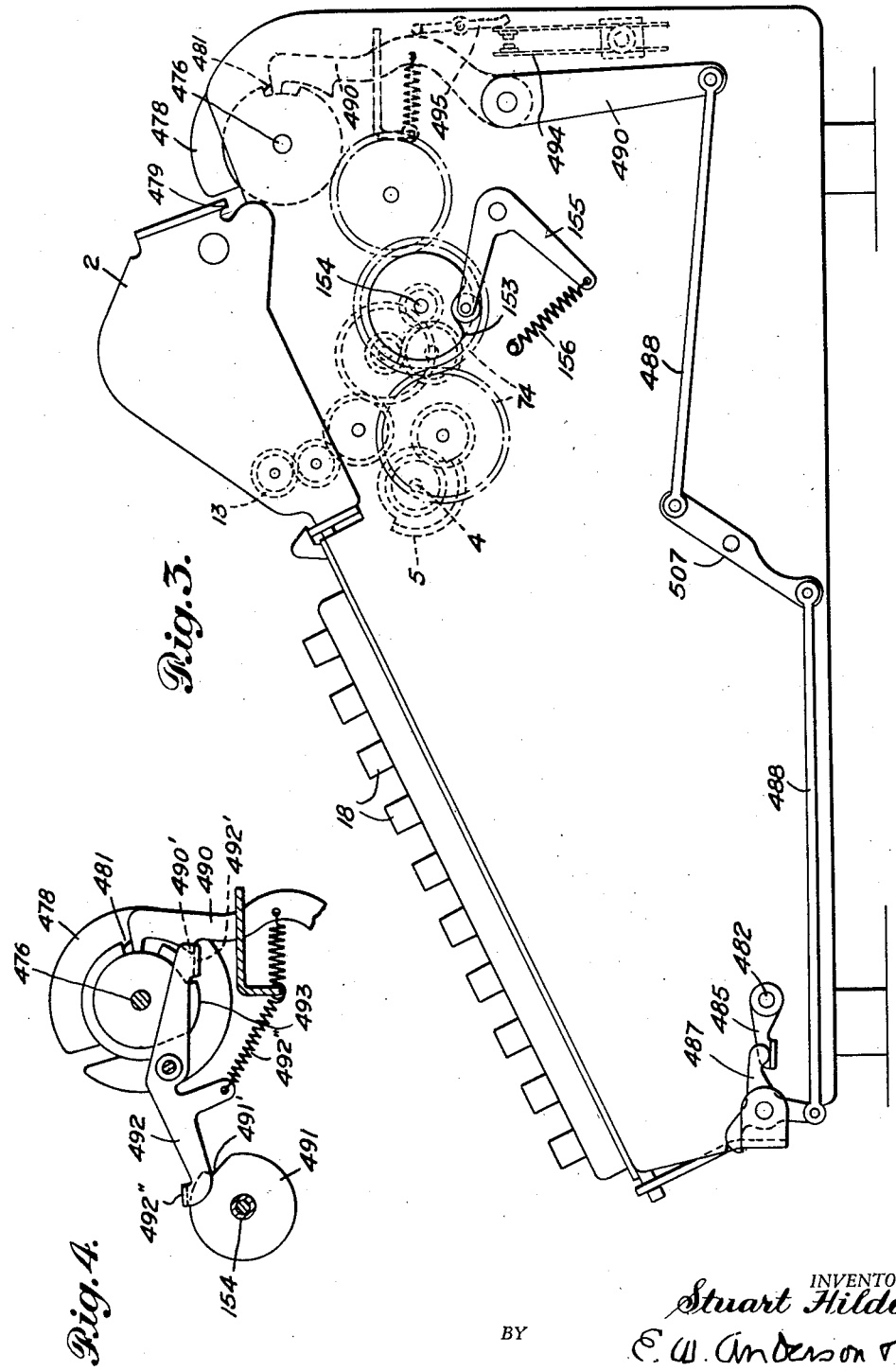
INVENTOR
Stuart Hilder
BY E. W. Anderson & Son
ATTORNEY Patented Mar. 27, 1951

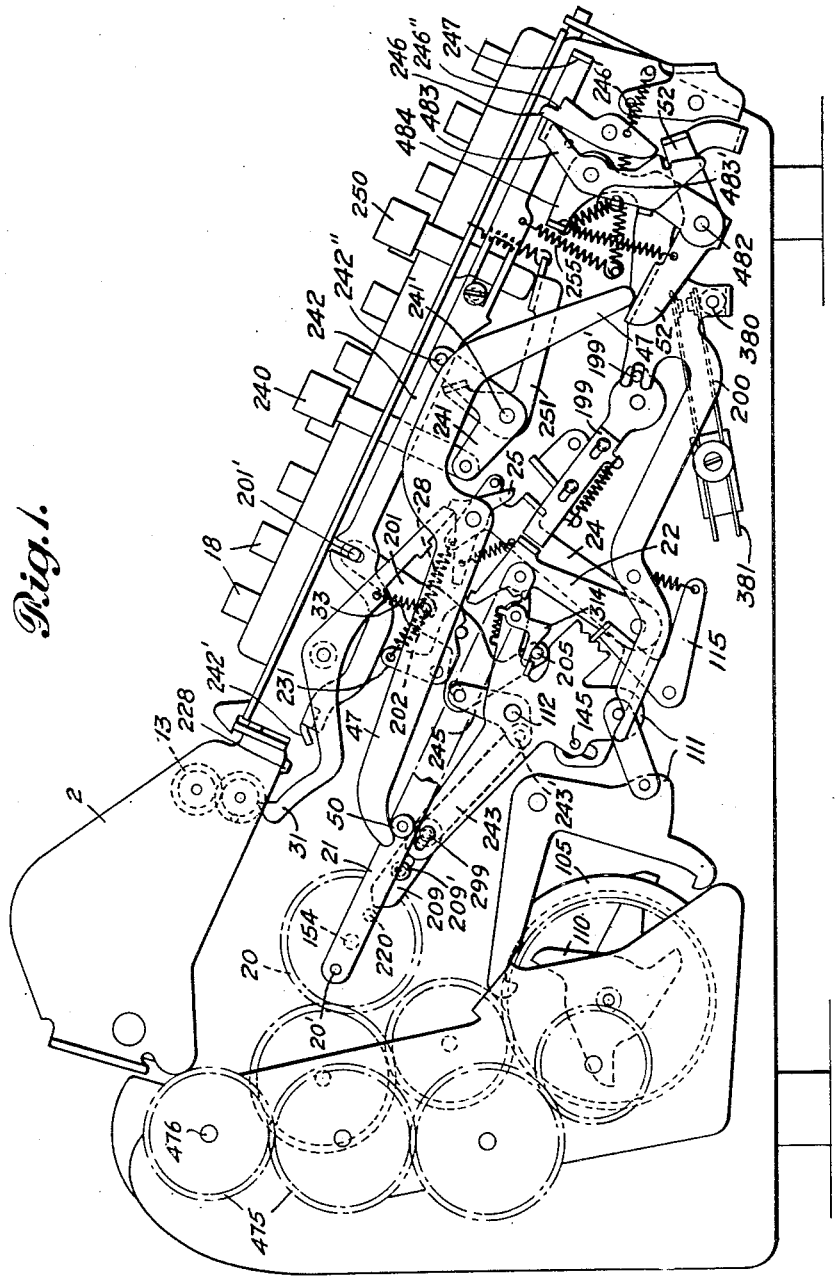

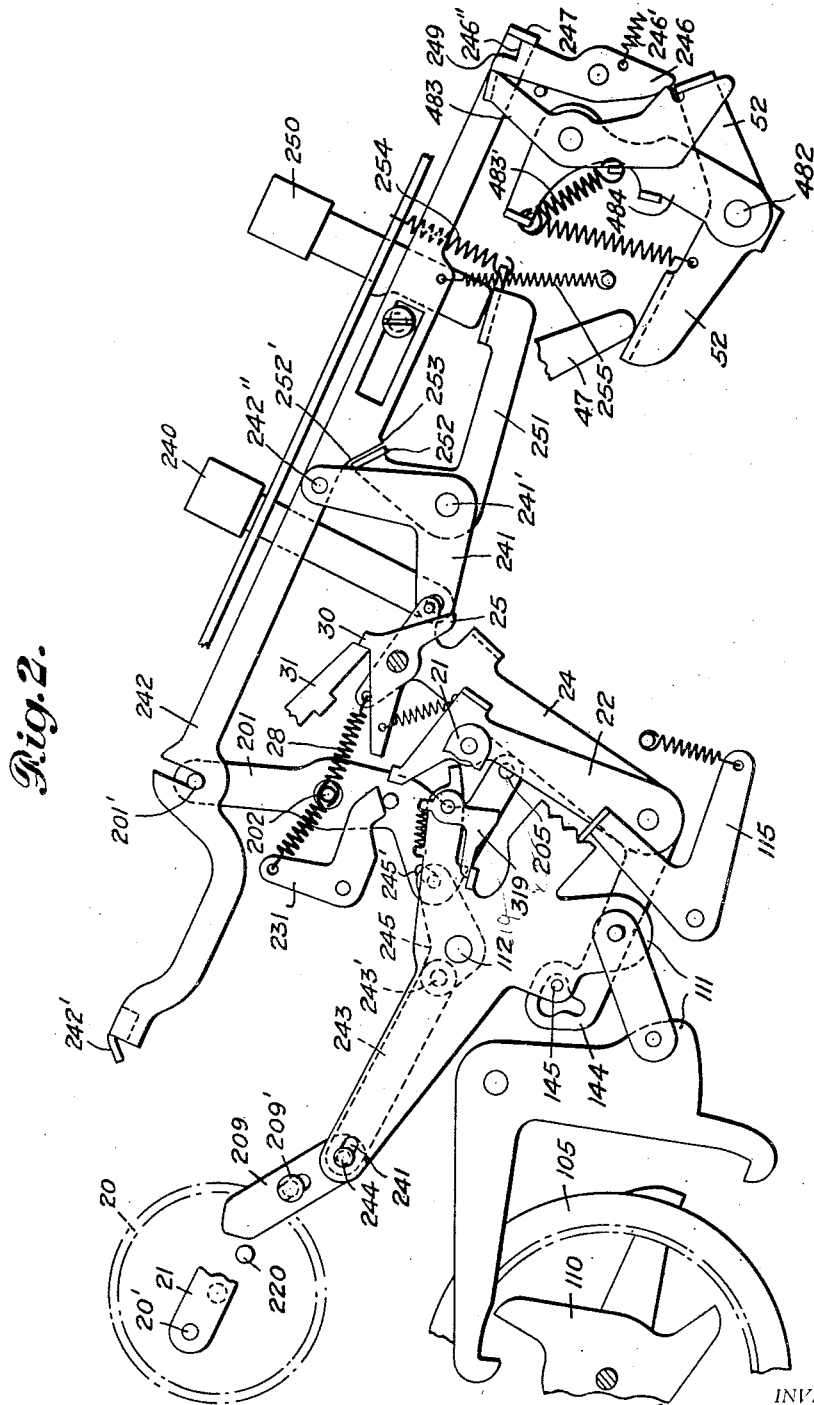

2,546,893

UNITED STATES PATENT OFFICE 2,546,893

OPERATION CONTROL AND TERMINATING MECHANISM

Stuart Hilder, Arlington, Va., assignor to Monroe Calculating Machine Company, Orange, N. J., a corporation of Delaware Application August 6, 1947, Serial No. 766,724

13 Claims. (Cl. 235—62)

1

The invention relates to calculating machines and particularly to an improved means for terminating automatic operations involving registrations in a plurality of ordinal places, such as automatic division and automatic multiplication.

The invention consists in the novel construction and combinations of parts as hereinafter stated in the claims.

In the accompanying drawings:

Fig. 1 is a left side elevation of a calculating machine constructed in accordance with the invention, with the casing removed.

Fig. 2 is a similar view on an enlarged scale, with parts omitted, showing the control parts in positions assumed immediately following the depression of the division key.

Fig. 3 is a right side elevation of the machine, with casing removed and non-essential mechanisms omitted.

Fig. 4 is a detail right side elevation of a carriage shifting clutch and associated mechanism, parts being broken away.

In these drawings, the invention is shown as applied to a machine such as disclosed in the patent to Overbury, No. 1,964,478, which with the prior art stated therein is made part of this disclosure.

General operation

According to known construction, amounts set up on the differential actuator gears 5, by means of the keys 18, are registered upon the totalizer wheels 13 upon rotation of the actuator shaft 4 and the shaft 154 upon which the tens carry members are mounted. Shafts 4 and 154 are connected with an electric motor through a train of gears 74 which is adapted for forward or reverse rotation to register additively or subtractively on the wheels 13. Characteristically the machine is driven by the electric motor, having connection through differential gear clutch and reversing mechanism with the shafts 4 and 154. The net number of additive or subtractive rotations of shafts 4 and 154, constituting the operative cycles of the machine, is registered upon multiplier-quotient wheels in the usual manner. The totalizer wheels 13 and the multiplier-quotient wheels are mounted in a denominationally shiftable carriage 2 utilized in multiplication and division in the well known manner.

Upon engagement of the clutch lever 111 with one or the other of the oppositely rotating differential gear clutch elements 105, 110, which

2 are concentric with and driven indirectly from the motor shaft, the differential totalizer wheel actuators 5 of the machine will be driven additively or subtractively through the gearing 74 from said motor shaft. A parallel train of gears 475 connects the motor shaft with the carriage shifting shaft 476. A worm 478, shown in Fig. 4, is supported upon shaft 476 and adapted to be operatively connected with said shaft by means of a clutch 481, said worm engaging teeth of a rack 479 of the shiftable carriage 2 and serving upon closing of the clutch to shift the carriage to the left. This clutch is of well known type, being rendered effective upon engagement of a clutch pawl of the driven member of the clutch with the related clutch teeth of the constantly driven shaft 476. The clutch pawl is spring biased to engage the clutch teeth, and is normally held disengaged from said teeth by a trigger 490. Momentary displacement of the trigger permits engagement of the clutch pawl, the disengagement of the clutch whereby it is rendered ineffective taking place in full cycle position of the moving parts upon reengagement of the pawl with the trigger.

As in the Overbury Patent 1,964,478, counterclockwise movement of division lever 201 about its fulcrum 202, will set certain mechanism to control the automatic calculation of a division problem, and the machine will be set in operation for subtractive registration. Specifically a pin 205 of said division lever will engage a pawl 319 mounted upon one member of the compound clutch lever 111, whereby the latter will be thrown to subtraction operating position. In this setting of the parts, the pin 205 will move beyond pawl 319, leaving the main clutch lever 111 free to be moved into any one of its additive, subtractive or neutral positions, in which positions it will be yieldably held by spring click 115. Movement of main clutch lever 111 from its neutral position will effect closure of the contacts of circuit breaker 381 interposed in the circuit of the motor drive, by means of an intermediately fulcrumed lever 200 having a rear cam face engaging a stud of clutch lever 111 and at its other end having a roller 380 engaging one of the spring contacts of the circuit breaker. The lever 200 has operating connection 199' with a lock bar 199 normally located in line with the path of movement of and contacting rock arm 22. Normally this lock bar 199 maintains the rock arm 22 with its link connection 21 with eccentric pin 20' of gear 20 in extreme rearwardly thrown dead center position, and thus prevents rocking of arm 22 and rotation of the actuating means; but actuation of said lever 200 by clutch lever 111 as aforesaid will move said lock bar out of the path of movement of rock arm 22, thereby permitting rotation of the actuating means in either direction.

Setting of the division lever 201 also adjusts an operation reversing tooth 209 into potentially active position and sets a pawl 483 in the carriage shift control train into operative position.

These two adjustments are not effected by the means for that purpose shown in the Overbury Patent 1,964,478, but by modified means to be described hereinafter.

The main clutch being engaged, the differential actuators will continue to cycle in a substractive direction until the dividend in the totalizer wheels 13 is reduced to less than zero, whereupon the totalizer wheels located to the left of the dividend will be moved from a registration of 0 to a registration of 9 by the action of the tens carry mechanism.

Upon overcarry movement of the totalizer wheels 13 occurring as aforesaid, a pin on one of said wheels will displace a trigger 31, against the tension of its spring 33, so that its forward end will be raised from engagement with lug 30 of pawl 25 mounted on rock arm 24, whereupon said pawl, assisted by its spring, will drop into engagement with said second rock arm 22 connected by said link 21, Figs. 1 and 2, with an eccentric pin 20' of a gear 20 upon shaft 154, driven in one to one ratio with the shaft 4 upon which the differential actuators 5 are mounted. Therefore after the eccentric connection of link 21 with gear 20 passes through dead center position, which corresponds with full cycle position of the differential actuators, link 21 moving forwardly will carry arm 24 therewith and a suitable cam face of extension 144 of arm 24, acting on pin 245 of the compound clutch lever 111, will centralize said lever and thus free the actuating means from the motor drive. At the same time a spring 28 attached to rock arm 24 will absorb the momentum of the moving parts and thereafter restore these parts to full cycle position.

During this movement to full cycle position the pin 220, on gear 20, rotating in a clockwise direction, will engage the free end of reversing tooth 209 and rock the clutch lever 111 into position of engagement with a clutch tooth of the gear element 105.

The main clutch being reengaged, the machine will make a single cycle of additive operation, to correct the overdraft, during which cycle the totalizer wheels will again trip trigger 31. In this case, however, pin 220, being returned toward full cycle position by rotation of gear 20 in the opposite direction, will act to engage clutch lever 111 with the teeth of clutch element 110, effecting subtractive rotation of the differential actuators.

Before this reclutching is effected, however, the reversed rotation of crank pin 20', moving from dead center in a clockwise direction as viewed in Figure 1, has initiated a one step shift of carriage 2, toward the left. This is effected, during the forward movement of rock arm 24.

During this forward movement of rock arm 24, a push rod (lever) 47 pivoted thereon, will be carried forwardly and, since the parts are rotating additively, the rear end of said lever 47 will be engaged by a roller 50 on link 21, whereby said lever 47 will be held in position to actuate a bell crank lever 52 loosely mounted on a shaft 482.

It may be noted that in concluding a subtractive registration crank pin 20' will move downward from dead center position, and push rod 47 will travel idly along the contacting portion of lever 52. Mounted upon an arm 484 rigidly secured upon shaft 482 is said pawl 483 which is settable as hereinafter explained so that upon actuation of said lever 52 by rod 47 the shaft 482 will be rocked. This shaft 482 has operating connection 486 (Fig. 3) with a carriage shift lever 487, having operating connections 488, 507 with the trigger 490. Therefore upon rocking of shaft 482 as aforesaid, the trigger will be displaced and the related clutch rendered effective to shift the carriage one step to the left.

In order that the main clutch 111 may not be rendered effective until the carriage shifting operation is completed, a notched disk 491 is secured upon shaft 154, and a check arm 492 is pivoted on the stationary framing, being normally held in ineffective position against the tension of its spring by a shoulder 490' of clutch lever 490 engaging a lug 492' of said check arm. As rock arm 24 moves forwardly, and clutch lever 490 is moved to ineffective position, a lug 492'' of said check arm will drop into the notch of disk 491, said disk at this time rotating counterclockwise (Fig. 4). During the return movement of rock arm 24, disk 491 will be rotated clockwise, bringing a cam shoulder of the notch 491' of said disk against the lug 492'' of check arm 492. At this time the carriage shifting clutch 481 is approaching its full cycle position, and a cam 493 fast to said clutch will engage the lug 492' of said check arm, raising the lug 492'' of the check arm out of engagement with the wall of the notch 491', the cam angle of the wall of the notch providing for free movement of the arm 492.

It has been seen that the circuit of the electric motor is broken at circuit breaker 380 when the main clutch is disengaged, and in order that the circuit may remain closed during a carriage shift operation a second circuit breaker 494 is provided, in a parallel motor circuit. The contacts of circuit breaker 494 are controlled by a lever 495, engaged by the trigger 490 and movable thereby to engage said contacts, as the clutch is rendered effective.

Restoring means

According to the preferred form of the invention, herein illustrated, division lever 201 is thrown into its operative position (shown in Figure 2) upon manual depression of a key 240. Key 240 at the lower end thereof is pivoted to one arm of a bell crank lever 241, fulcrumed at 241' to the stationary framing, the other arm of said lever being pivoted to a longitudinally reciprocatory rod or bar 242 having operative connection 201' with the upper end of the division lever 201.

The restoring means of the present invention provides that division lever 201 shall remain in its active position until the entire division calculation has been completed, this making it possible to provide a positive connection between the division lever and the reversing tooth 209, so that the latter will be preliminarily set and finally retracted together with said division lever.

Upon depression of the division key 240, tooth 209 will be moved from normal retracted into potentially effective position by means of a link 243 having at one end pivotal connection with the forward end of tooth 209 by means of the pin 244. At its other end link 243 is pivoted at 243' to a bell crank lever 245, the latter being fulcrumed at 112 in register with the fulcrum, also designated 112, of the upper member of the compound clutch lever 111. The bell crank lever 245 has pin and slot connection 245' with the division lever 201, so that said division lever in moving into division controlling position will rock bell crank lever 245 and move tooth 209 to effective position. At the same time, however, the clutch lever 111 will be moved into subtraction controlling position and this will swing tooth 209 about its fulcrum to the position shown in Fig. 2, wherein said tooth will be in inactive position out of the path of movement of pin 220 of gear 20.

According to the preferred form of the invention means are provided, which will later be described in detail, for restoring the division key 240 and the division control lever 201. This means involves a switch device comprising two members one of which forms part of the carriage shift initiating power train previously described and the other of which forms part of the restoring means, said switch members having spring means to position them to render the carriage shift switch member normally irresponsive and the restoring switch member normally responsive to said power train. The means comprising said reciprocatory rod and said division key 240 for adjusting the division control lever 201 to effective position also provides for adjusting said switch device against the tension of its spring to render the carriage shift switch member responsive and the restoring switch member irresponsive to said power train. Finally a member 228 mounted on the carriage and operable as the carriage moves to extreme left hand shifted position acts to adjust said reciprocatory rod 242 pivotally, as a lever, to release said switch device and permit readjustment thereof by its spring to render the carriage shift switch member again irresponsive and said restoring switch member again responsive to said power train to restore the parts to normal position.

This switch device comprises the aforesaid pawl lever 483 and a lever 246 fulcrumed to the stationary framing. Lever 246 has a light spring 246' connecting an arm thereof with said framing, the other arm thereof being contacted by said pawl lever 483, which latter has a superior spring 483' connecting an arm thereof with part 484, lever 246 being thereby normally positioned as in Fig. 1, in the path of movement of said lever 52 and pawl lever 483 normally positioned out of the path of movement of said lever 52 to render the carriage shift means ineffective.

Upon depression of the division key 240, through the medium of reciprocatory rod 242, the division control lever 201 will be adjusted to effective position and said switch device will be adjusted, against the tension of the superior spring 483', to render the carriage shift means effective and the restoring means ineffective, as in Fig. 2, due to a lug 247 on the forward end of bar 242 contacting lever 246.

The division key 240 and the parts settable thereby are held in effective position by means of a spring click 231 engaging a stud of the division lever 201.

As previously stated the disengagement of the main clutch and the engagement of the carriage shift clutch is controlled by the totalizer wheels in the overcarry movement thereof occurring during the corrective additive cycle in a division operation, this taking place in any shifted position of the carriage.

Means are provided for restoring the parts to normal position when the capacity of the machine has been reached, and alternatively operable means are provided for restoring the parts to normal position at will, subject to completion of the current quotient figure registration. As the totalizer wheel carriage moves into extreme left hand position in the performance of a division operation, a projection 228 of the carriage will contact the rear end 242' of rod 242 and rock said rod, as a lever, upon its connection 242'' with bell crank lever 241 as a fulcrum, lifting the forward end lug 247 of said rod sufficiently to bring said lug 247 into line with an upper notch 246'' of lever 246, whereupon superior spring 483' will restore pawl 483 and lever 246 to normal position, wherein said lug 247 will be located within said notch 246'' in contact with edge 249 of said notch.

As the totalizer wheel carriage moves into this extreme left hand position, subtraction operation is started, as usual, and an overdraft and a corrective additive cycle of operation occurs as in the other carriage shifted positions. At the end of this particular corrective additive cycle, however, movement of push rod 47 against lever 52 will cause lever 52 to actuate said lever 246, (now restored to normal position) reversely to its actuation by said reciprocatory rod 242, thereby restoring reciprocatory rod 242, the division control lever 201 and the division key 240 to normal position. In this restoration, pin 205 of the division lever will idly actuate and pass the pawl 319, without restoring the main clutch lever 111, and reversing tooth 209 will be retracted by lever 245 and link 243 so that the machine will come to rest in full cycle position because of failure to again close the main cutch 111.

For the purpose of stopping division operations at will, subject to completion of the current quotient figure registration, a depressible stop key 250 at its lower end contacts an arm of a bell crank lever 251, the other arm of which, when the parts are in the position of Fig. 2, has slidable cam engagement 252 with said reciprocatory rod 242 to rock the latter and release lever 246, thereby permitting spring 483' to restore the switch device 483, 246, to normal position, the effect being the same as that attained upon movement of the carriage to extreme left hand position as aforesaid, except that the restoration may occur at any stage of a division operation.

In order to insure that the reciprocatory rod 242 shall under all circumstances be held in rocked position with its lug 247 above the lower wall of notch 246'' of the lever 246 until the restoring means is operated, the cam portion 252' of rod 242 terminates at its lower end in a tooth 253, which tooth will drop behind the upper end of the adjacent arm of bell crank lever 251 upon depression of stop key 250. This will prevent reverse operation of said bell crank lever 251 under influence of its retracting spring 254 until the rod 242 has been reversely moved by the restoring means, at which time bell crank lever 251 will escape from tooth 253 and the parts including the division key and the stop key will be restored to normal position.

It is to be noted that the division and stop keys may be simultaneously depressed, in which case the machine would compute a single quotient figure and then stop in normal condition. Further, it is to be noted that if the stop key is depressed and released with the division key in raised position, said stop key will not be latched down, the key 250 and bell crank lever 251 moving idly and returning to normal position. This will prevent an erroneous operation of the machine in case of accidental depression of the stop key while the machine is standing still.

It will be obvious that the present invention may be utilized to restore a multiplier key, in machines wherein both factors of the problem are set up and the product is obtained by a series of automatically controlled registrations and shifting of the carriage. For instance, the Overbury Patent No. 1,964,211 shows automatic division mechanism identical with that of the Overbury Patent No. 1,964,478, to which the present invention is shown as applied, and has in addition a multiplier control lever having operating connection with the division lever. Movement of the multiplier lever to operative position will, among other things, set the division lever also to operative position, and retraction of the division lever, whether manually or automatically, will effect retraction of the multiplier lever and of the multiplier devices settable thereby. No change of the multiplier mechanism of this patent would be necessary in order to control it through the division controls of the present invention.

Obviously the motor key 240 need have only operative connection with bell crank lever 241. That is to say, the pivotal connection shown need not be used, in which case upon restoration of the shiftable rod 242 the motor key will be restored by said bell crank lever 241 to a normal raised position. Or alternatively the motor key 240 may be spring-retracted.

I claim:

1. In a calculating machine having a denominationally shiftable carriage, totalizer wheels thereon, differential actuators for said totalizer wheels, and carriage shifting means; the combination with means settable to effect alternate operation of said differential actuators and of said carriage shifting means, including a power train, means for operating said train upon the completion of totalizer wheel actuation in each shifted carriage position, and an operation initiating and controlling key; of means operable to restore the operation key to inactive position including a restoring element normally spring located in operative position interposed in said power train and displaceable against its spring bias to inactive position, a releasable operating connection between the key and said restoring element designed to displace and hold said element inactive against its spring bias upon manual operation of the key, and means comprising a second manipulable key to release the operating connection from restraining engagement with and permit the return of the spring located restoring element of the power train by its spring.

2. In a calculating machine having a denominationally shiftable carriage, totalizer wheels thereon, differential actuators for said totalizer wheels, and carriage shifting means; the combination with means settable to effect alternate operation of said differential actuators and of said carriage shifting means, including a power train, means for operating said train upon the completion of totalizer wheel actuation in each shifted carriage position, and an operation initiating and controlling key; of means operable to restore the operation key to inactive position including a restoring element normally spring located in operative position interposed in said power train and displaceable against its spring bias to inactive position, a releasable operating connection between the key and said restoring element designed to displace and hold said element inactive against its spring bias upon manual operation of the key, and a projection upon the carriage and engageable with the operating connection upon movement of the carriage into an extreme shifted position to adjust said operating connection and thereby release and permit the return of said spring located restoring element by its spring.

3. In a calculating machine having a denominationally shiftable carriage, totalizer wheels thereon, differential actuators for said totalizer wheels, and carriage shifting means; the combination with means settable to effect alternate operation of said differential actuators and of said carriage shifting means, including a power train operable to initiate a carriage shift, means for operating said power train upon the completion of totalizer wheel actuation in each shifted carriage position, and an operation initiating and controlling key; of means settable to enable and thereafter to disable the shift initiating train including a carriage shift element normally spring located in inoperative position interposed in said power train, a releasable operating connection between the key and said carriage shift element designed to displace and hold said element in operative position against its spring bias upon manual operation of the key to enable said power train, and a projection upon the carriage and engageable with the operating connection upon movement of the carriage into an extreme shifted position to adjust said operating connection and thereby release and permit the return of said carriage shift element by its spring to disable the power train.

4. In a calculating machine having a denominationally shiftable carriage, totalizer wheels thereon, differential actuators for said totalizer wheels, and carriage shifting means; the combination with means settable to effect alternate operation of said differential actuators and of said carriage shifting means, including a power train operable to initiate a carriage shift, means for operating said train upon the completion of totalizer wheel actuation in each shifted carriage position, and an operation initiating and controlling key; of operation key restoring means including a switch interposed in the power train and settable alternatively to provide for key restoration or carriage shift, spring means normally holding said switch in restoring position, a releasable operating connection between the key and the switch designed to set the switch to carriage shifting position, against the tension of its spring, upon manual operation of the key, and means operable to release said operating connection from restraining engagement with the switch.

5. In a calculating machine having a denominationally shiftable carriage, totalizer wheels thereon, differential actuators for said totalizer wheels, and carriage shifting means; the combination with means settable to effect alternate operation of said differential actuators and of said carriage shifting means, including a power train operable to initiate a carriage shift, means for operating said train upon the completion of totalizer wheel actuation in each shifted carriage position, and an operation initiating and controlling lever; of a switch interposed in the power train and settable from non-shift to carriage shift initiating position, spring means normally holding said switch in non-shift position, a manipulable key and a control bar settable thereby to adjust said operation initiating lever to effective position and to set the switch to carriage shift initiating position against the tension of its spring, and means operable to release said control bar from restraining engagement with the switch, said switch including a lever operable by the power train in the non-shift position of said switch to restore the control bar and thereby restore said operation initiating lever and said manipulable key to their ineffective positions.

6. In a motor calculating machine, having a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of said differential actuating means and said carriage shift means comprising a power train in train with the motor and means for operating said train upon completion of totalizer wheel actuation in each shifted position of the carriage; means for restoring said control means comprising an element normally spring-located in position to respond to said power train, a stop key, and means for adjusting said element against the tension of its spring simultaneously with the setting of said control means by said motor key to render it irresponsive to said power train and for releasing said element for retraction by its spring upon manipulation of said stop key to render it again responsive to said power train.

7. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by said carriage for restoring said control means comprising a power train in train with the motor, means for operating said train upon completion of totalizer wheel actuation in each shifted position of the carriage, an element forming part of said restoring means normally spring-located in position to respond to said power train, and means for adjusting said element against the tension of its spring simultaneously with the setting of said control means to render it irresponsive to said power train and for releasing said element for retraction by its spring to render it again responsive to said power train upon shifting of the carriage to extreme left hand position.

8. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by said carriage for restoring said control means comprising a power train in train with the motor, means for operating said train upon completion of totalizer wheel actuation in each shifted position of the carriage, a switch the elements of which respectively form part of the carriage shift means and the restoring means and are normally respectively irresponsive and responsive to said power train, means for operating said switch simultaneously with the setting of said control means to render the carriage shift element responsive and the restoring element irresponsive to said power train and for reversely operating said switch upon shifting of the carriage to extreme left hand position to render the carriage shift element again irresponsive and the restoring element again responsive to said power train.

9. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by said carriage for restoring said control means comprising a power train in train with the motor, means for operating said train upon completion of totalizer wheel actuation in each shifted position of the carriage, a switch the elements of which respectively form part of the carriage shift means and the restoring means and are respectively normally spring-located irresponsive and responsive to said power train, means for operating said switch to adjust said elements against the tension of their springs simultaneously with the setting of said control means to render the carriage shift element responsive and the restoring element irresponsive to said power train and for releasing said elements for retraction by their springs to accomplish reverse operation of said switch upon shifting of the carriage to extreme left hand position.

10. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by said carriage for restoring said control means or in part controlled by manually adjustable means for alternatively restoring said control means at will comprising a power train in train with the motor, means for operating said train upon completion of totalizer wheel actuation in each shifted position of the carriage, a switch the elements of which respectively form part of the carriage shift means and the restoring means and are respectively normally irresponsive and responsive to said power train, a stop key, means for operating said switch simultaneously with the setting of said control means to render the carriage shift element responsive and the restoring element irresponsive to said power train and for reversely operating said switch upon shifting of the carriage to extreme left hand position or alternatively upon manipulation of said stop key to render the carriage shift element again irresponsive and the restoring element again responsive to said power train.

11. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by the carriage for restoring said control means comprising a power train in train with the motor, means for operating said train upon completion of totalizer wheel actuation in each shifted position of the carriage, a switch the elements of which respectively form part of the carriage shift means and the restoring means and are respectively normally spring-located irresponsive and responsive to said power train, means for operating said switch to adjust said elements against the tension of their springs simultaneously with the setting of said control means by said motor key to render the carriage shift element responsive and the restoring element irresponsive to said power train and for releasing said elements for retraction by their springs to accomplish reverse operation of said switch upon shifting of the carriage to extreme left hand position to render the carriage shift element again irresponsive and the restoring element again responsive to said power train comprising a longitudinally shiftable rod with which said key has operative lever connection and means on the carriage engaging said rod to adjust it pivotally upon its connection with said lever as a fulcrum.

12. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by said carriage for restoring said control means or in part controlled by manually adjustable means for alternatively restoring said control means at will comprising a power train in train with the motor, means for operating said train upon completion of totalizer wheel actuation in each shifted position of the carriage, a switch the elements of which respectively form part of the carriage shift means and the restoring means and are respectively normally spring-located irresponsive and responsive to said power train, means for operating said switch to adjust said elements against the tension of their springs simultaneously with the setting of said control means by said motor key to render the carriage shift element responsive and the restoring element irresponsive to said power train and for releasing said elements for retraction by their springs to accomplish reverse operation of said switch upon shifting of the carriage to extreme left hand position to render the carriage shift element again irresponsive and the restoring element again responsive to said power train comprising a longitudinally shiftable rod with which said motor key has an operative lever connection, means on the carriage engaging said rod upon shifting the carriage to extreme left hand position to adjust said rod pivotally upon its connection with said lever as a fulcrum, a stop key, and alternatively operable means for pivotally adjusting said rod upon manipulation of said stop key.

13. In a motor driven calculating machine, the combination of a denominationally shiftable carriage, totalizer wheels thereon, differential actuating means for said totalizer wheels, carriage shifting means, a motor key, control means settable by said key, and means controlled by said control means for initiating and maintaining operation of the machine and for effecting alternate operation of the differential actuating means and the carriage shift means and in part controlled by the carriage for restoring said control means or in part controlled by manually adjustable means for alternatively restoring said control means at will comprising a power train in train with the motor, means for operating said train upon completion of totalizer wheel actuation in each shifted position of the carriage, a switch having lever elements respectively forming part of the carriage shift means and the restoring means and respectively normally spring-located irresponsive and responsive to said power train, means for operating said switch to adjust said elements against the tension of their springs simultaneously with the setting of said control means by said motor key to render the carriage shift element responsive and the restoring element irresponsive to said power train, and for releasing said elements for retraction by their springs to accomplish reverse operation of said switch and render the carriage shift element again irresponsive and the restoring element again responsive to said power train comprising a longitudinally shiftable rod with which said key has operative lever connection, means on the carriage engaging said rod upon shifting of the carriage to extreme left hand position to adjust said rod pivotally upon its connection with said lever as a fulcrum, said restoring element having an upper notch, said rod having a lug engaging said notch upon pivotal adjustment of said rod and retraction of said switch elements by their springs, a stop key, and means comprising a spring retracted bell crank lever having slidable cam engagement with said rod to alternatively effect said pivotal adjustment upon manipulation of said stop key, the cam portion of said rod having a tooth with which said bell crank lever has momentary engagement to prevent retraction by its spring and thereby hold said rod in adjusted position until operation of said power train.

STUART HILDER.

REFERENCES CITED

The following references are of record in the file of this patent:

UNITED STATES PATENTS

| Number | Name | Date |
|---|---|---|
| 1,888,161 | Chase | Nov. 15, 1932 |
| 1,964,478 | Overbury | June 26, 1934 |
| 2,014,013 | Avery et al. | Sept. 10, 1935 |
| 2,046,820 | Hilder | July 7, 1936 |
| 2,200,588 | Avery | May 14, 1940 |
| 2,250,403 | Chase | July 22, 1941 |
| 2,318,241 | Mathi | May 4, 1943 |
| 2,327,981 | Friden | Aug. 31, 1943 |
| 2,377,767 | Dustin et al. | June 5, 1945 |